(12) United States Patent
Chiu et al.

(10) Patent No.: US 7,593,637 B2
(45) Date of Patent: Sep. 22, 2009

(54) OPTICAL TRANSPORT SYSTEM ARCHITECTURE FOR REMOTE TERMINAL CONNECTIVITY

(76) Inventors: Angela Chiu, 9 Huntley Rd., Holmdel, NJ (US) 07733; Michael Herbert Eiselt, 250 Martin Pl., Middletown, NJ (US) 07748; Jay Martin Wiesenfeld, 15 Oak St., Lincroft, NJ (US) 07738-1818; Lara Denise Garrett, 23 Irving Pl., Red Bank, NJ (US) 07701; Mark Shtaif, Maale Hartetamim 3 A, P.O. Box 3048, Even Yehuda (IL) 40500

( * ) Notice: Subject to any disclaimer, the term of this patent is extended or adjusted under 35 U.S.C. 154(b) by 579 days.

(21) Appl. No.: 10/427,896

(22) Filed: Apr. 30, 2003

(65) Prior Publication Data

US 2004/0022545 A1    Feb. 5, 2004

Related U.S. Application Data

(60) Provisional application No. 60/377,085, filed on Apr. 30, 2002.

(51) Int. Cl.
    *H04J 14/00* (2006.01)
(52) U.S. Cl. .............................. 398/45; 398/48; 398/49
(58) Field of Classification Search .................. 398/45, 398/48–49, 58–59, 67
    See application file for complete search history.

(56) References Cited

U.S. PATENT DOCUMENTS

| 4,229,831 A | 10/1980 | Lacher |
| 4,535,459 A | 8/1985 | Hogge, Jr. |
| 4,636,859 A | 1/1987 | Vernhet et al. |
| 4,710,022 A | 12/1987 | Soeda et al. |
| 5,224,183 A | 6/1993 | Dugan |
| 5,225,922 A | 7/1993 | Chraplyvy et al. |
| 5,267,071 A | 11/1993 | Little et al. |
| 5,299,048 A | 3/1994 | Suyama |
| 5,321,541 A | 6/1994 | Cohen |
| 5,351,146 A | 11/1994 | Chan et al. |
| 5,455,703 A | 10/1995 | Duncan et al. |
| 5,559,625 A | 9/1996 | Smith et al. |
| 5,613,210 A | 3/1997 | Van Driel et al. |
| 5,726,784 A | 3/1998 | Alexander et al. |
| 5,737,118 A | 4/1998 | Sugaya et al. |
| 5,778,116 A | 7/1998 | Tomich |
| 5,790,285 A | 8/1998 | Mock |
| 5,812,290 A | 9/1998 | Maeno et al. |
| 5,877,881 A | 3/1999 | Miyauchi et al. |
| 5,903,613 A | 5/1999 | Ishida |
| 5,914,794 A | 6/1999 | Fee |
| 5,914,799 A | 6/1999 | Tan |
| 5,936,753 A | 8/1999 | Ishikawa |

(Continued)

FOREIGN PATENT DOCUMENTS

| JP | 01115230 | 5/1989 |
| JP | 02238736 | 9/1990 |

*Primary Examiner*—Dzung D Tran
(74) *Attorney, Agent, or Firm*—Woodcock Washburn LLP (57) ABSTRACT

The invention pertains to optical fiber transmission systems, and is particularly relevant to transmission of high volume of data and voice traffic among different locations. In particular, the improvement teaches the use of a single optical transport system for both metropolitan area transport and long haul transport of data and voice traffic.

69 Claims, 5 Drawing Sheets

U.S. PATENT DOCUMENTS

| | | | |
|---|---|---|---|
| 5,940,209 A | 8/1999 | Nguyen |
| 5,963,350 A | 10/1999 | Hill |
| 5,995,694 A | 11/1999 | Akasaka et al. |
| 6,005,702 A | 12/1999 | Suzuki et al. |
| 6,021,245 A | 2/2000 | Berger et al. |
| 6,038,062 A | 3/2000 | Kosaka |
| 6,075,634 A | 6/2000 | Casper et al. |
| 6,078,414 A | 6/2000 | Iwano |
| 6,081,360 A | 6/2000 | Ishikawa et al. |
| 6,084,694 A | 7/2000 | Milton et al. |
| 6,088,152 A | 7/2000 | Berger et al. |
| 6,108,074 A | 8/2000 | Bloom |
| 6,122,095 A | 9/2000 | Fatehi |
| 6,151,334 A | 11/2000 | Kim et al. |
| 6,157,477 A | 12/2000 | Robinson |
| 6,160,614 A | 12/2000 | Unno |
| 6,163,392 A | 12/2000 | Condict et al. |
| 6,163,636 A | 12/2000 | Stentz et al. |
| 6,173,094 B1 | 1/2001 | Bowerman et al. |
| 6,177,985 B1 | 1/2001 | Bloom |
| 6,198,559 B1 | 3/2001 | Gehlot |
| 6,229,599 B1 | 5/2001 | Galtarossa |
| 6,236,481 B1 | 5/2001 | Laor |
| 6,236,499 B1 | 5/2001 | Berg et al. |
| 6,246,510 B1 | 6/2001 | BuAbbud et al. |
| 6,259,553 B1 | 7/2001 | Kinoshita |
| 6,259,554 B1 | 7/2001 | Shigematsu et al. |
| 6,259,693 B1 | 7/2001 | Ganmukhi et al. |
| 6,259,845 B1 | 7/2001 | Sardesai |
| 6,272,185 B1 | 8/2001 | Brown |
| 6,275,315 B1 | 8/2001 | Park et al. |
| 6,288,811 B1 | 9/2001 | Jiang et al. |
| 6,288,813 B1 | 9/2001 | Kirkpatrick et al. |
| 6,307,656 B2 | 10/2001 | Terahara |
| 6,317,231 B1 | 11/2001 | Al-Salameh et al. |
| 6,317,255 B1 | 11/2001 | Fatehi et al. |
| 6,323,950 B1 | 11/2001 | Kim et al. |
| 6,327,060 B1 | 12/2001 | Otani et al. |
| 6,356,384 B1 | 3/2002 | Islam |
| 6,359,729 B1 | 3/2002 | Amoruso |
| 6,388,801 B1 | 5/2002 | Sugaya et al. |
| 6,396,853 B1 | 5/2002 | Humphrey et al. |
| 6,438,286 B1 | 8/2002 | Duerksen |
| 6,608,709 B2 | 8/2002 | Duerksen |
| 6,519,060 B1 | 2/2003 | Lui |
| 6,519,082 B2 | 2/2003 | Ghera et al. |
| 6,583,901 B1 * | 6/2003 | Hung | 398/79 |
| 6,621,835 B1 * | 9/2003 | Fidric | 372/6 |
| 6,708,004 B1 * | 3/2004 | Homsey | 398/177 |
| 2001/0005271 A1 | 6/2001 | Leclerc et al. |
| 2001/0007605 A1 | 7/2001 | Inagaki et al. |
| 2001/0009468 A1 | 7/2001 | Fee |
| 2001/0014104 A1 | 8/2001 | Bottorff et al. |
| 2002/0012152 A1 | 1/2002 | Agazzi et al. |
| 2002/0015220 A1 | 2/2002 | Papernyl et al. |
| 2002/0034197 A1 | 3/2002 | Tornetta et al. |
| 2002/0044317 A1 | 4/2002 | Gentner et al. |
| 2002/0044324 A1 | 4/2002 | Hoshida et al. |
| 2002/0048287 A1 | 4/2002 | Silvers |
| 2002/0051468 A1 | 5/2002 | Ofek et al. |
| 2002/0063948 A1 | 5/2002 | Islam et al. |
| 2002/0064181 A1 | 5/2002 | Ofek et al. |
| 2002/0075903 A1 | 6/2002 | Hind |
| 2002/0080809 A1 | 6/2002 | Nicholson et al. |
| 2002/0135836 A1 * | 9/2002 | Shimizu | 359/124 |
| 2002/0145776 A1 * | 10/2002 | Chow et al. | 359/124 |
| 2004/0001715 A1 * | 1/2004 | Katagiri et al. | 398/81 |
| 2004/0208506 A1 * | 10/2004 | Kinoshita et al. | 398/19 |

* cited by examiner

OPTICAL TRANSPORT SYSTEM ARCHITECTURE FOR REMOTE TERMINAL CONNECTIVITY

CROSS-REFERENCE TO RELATED APPLICATIONS

This application claims priority to U.S. Provisional Patent Application Ser. No. 60/377,085, entitled "OPTICAL TRANSPORT SYSTEM UTILIZING REMOTE TERMINAL CONNECTIVITY", by Angela Chiu, filed Apr. 30, 2002, the content of which is incorporated by reference herein in its entirety.

TECHNICAL FIELD OF THE INVENTION

The present invention relates, in general, to the field of optical communications, and in particular to, an optical transport system that uses distributed terminals. Characteristics of a distributed terminal architecture are described in co-pending U.S. patent application Ser. No. 10/402,840 entitled "Distributed Terminal Optical Transmission System" incorporated herein by reference. More specifically, this invention teaches the architecture to provide connectivity between remote terminals.

BACKGROUND OF THE INVENTION

A goal of many modern long-haul optical transport systems is to provide for the efficient transmission of large volumes of voice traffic and data traffic over trans-continental distances at low costs. Various methods of achieving these goals include time-division multiplexing (TDM) and wavelength-division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser is often a DFB laser stabilized to a specified frequency on the ITU frequency grid. The laser may be directly modulated with a data train with an advantage of low cost, and a disadvantage of low reach and capacity performance. In many long-haul systems, the laser is externally modulated using a modulator. A single stage modulator is sufficient for a non-return-zero (NRZ) modulation format. A two-stage modulator is typically used with the higher performance return-to-zero (RZ) modulation format. An example of a modulator technology is the Mach-Zehnder lithium niobate modulator. Alternatively, an electro-absorptive modulator may be used. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two-level binary modulation scheme is predominantly employed. The receiver is located at the opposite end of the optical fiber, from the transmitter. The receiver is typically comprised of a semiconductor photodetector and accompanying electronics.

Typical long-haul optical transport dense wavelength division multiplexed (DWDM) systems transmit 40 to 80 channels at 10 Gbps (gigabit per second) across distances of 3000 to 6000 km in a single 35-nm spectral band. In a duplex system, traffic is both transmitted and received between parties at opposite end of the link. In a DWDM system, different channels operating at distinct carrier frequencies are multiplexed using a multiplexer. Such multiplexers may be implemented using arrayed waveguide grating (AWG) technology or thin-film technology, or a variety of other technologies. After multiplexing, the optical signals are coupled into the transport fiber for transmission to the receiving end of the link. The total link distance may, in today's optical transport systems, be two different cities separated by continental distances, from 1000 km to 6000 km, for example. To successfully bridge these distances with sufficient optical signal power relative to noise, the signal is periodically amplified using an in-line optical amplifier. Typical span distances between optical amplifiers are 50-100 km. Thus, for example, 30 100-km spans would be used to transmit optical signals between points 3000 km apart. Examples of in-line optical amplifiers include erbium doped fiber amplifiers (EDFAs) and semiconductor optical amplifiers (SOAs).

At the receiving end of the link, the optical channels are demultiplexed using a demultiplexer. Such demultiplexers may be implemented using AWG technology or thin-film technology, or a variety of other technologies. Each channel is then optically coupled to separate optical receivers.

Other common variations include the presence of post-amplifiers and pre-amplifiers just before and after the multiplexer and de-multiplexer. Often, there is also included dispersion compensation with the in-line amplifiers. These dispersion compensators adjust the phase information of the optical pulses in order to compensate for the chromatic dispersion in the optical fiber while appreciating the role of optical nonlinearities in the optical fiber. Another variation that may be employed is the optical dropping and adding of channels at cities located in between the two end cities. The invention disclosed applies in any of these variations, as well as others.

Traditionally, optical transport systems are either long haul systems, for traffic between distant cities, or metropolitan ("metro") systems for traffic in and around a city. Typically the terminals of a long-haul optical transport system are located in one location such as a central office, and all the channels in a DWDM system are terminated. The traffic is then sorted by electronic identification of data and routed to different parts of the metropolitan area using metropolitan optical transport systems. In many practical circumstances, there is a space, power and cost inefficiency in terminating the long haul signal and retransmitting over a second metro-system. For this reason, the concept of a distributed terminal architecture was invented, and is disclosed in co-pending U.S. patent application Ser. No. 10/402,840, hereafter referred to as Jaggi.

As taught by Jaggi, there was no provision for duplex traffic between distributed terminals in the same metropolitan area. It would be highly desirable for a terminal in one section of a city to exchange traffic with a second terminal in a second section of the city while also providing scalable communication with cities a great distance away.

SUMMARY OF THE INVENTION

In the present invention, improvements to an optical transport system with a distributed terminal architecture are disclosed. More specifically, this invention teaches the architecture to provide scalable duplex connectivity between multiple terminals and remote terminals.

In one embodiment of the invention, an overlay for connections in a distributed terminal architecture is taught.

In another embodiment of the invention, an architecture to provide scalable duplex connectivity between multiple terminals at a terminal city overlay is taught.

In another embodiment of the invention, an architecture to provide scalable duplex connectivity between terminals at optical-add-drop multiplexed (OADM) sites is taught.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
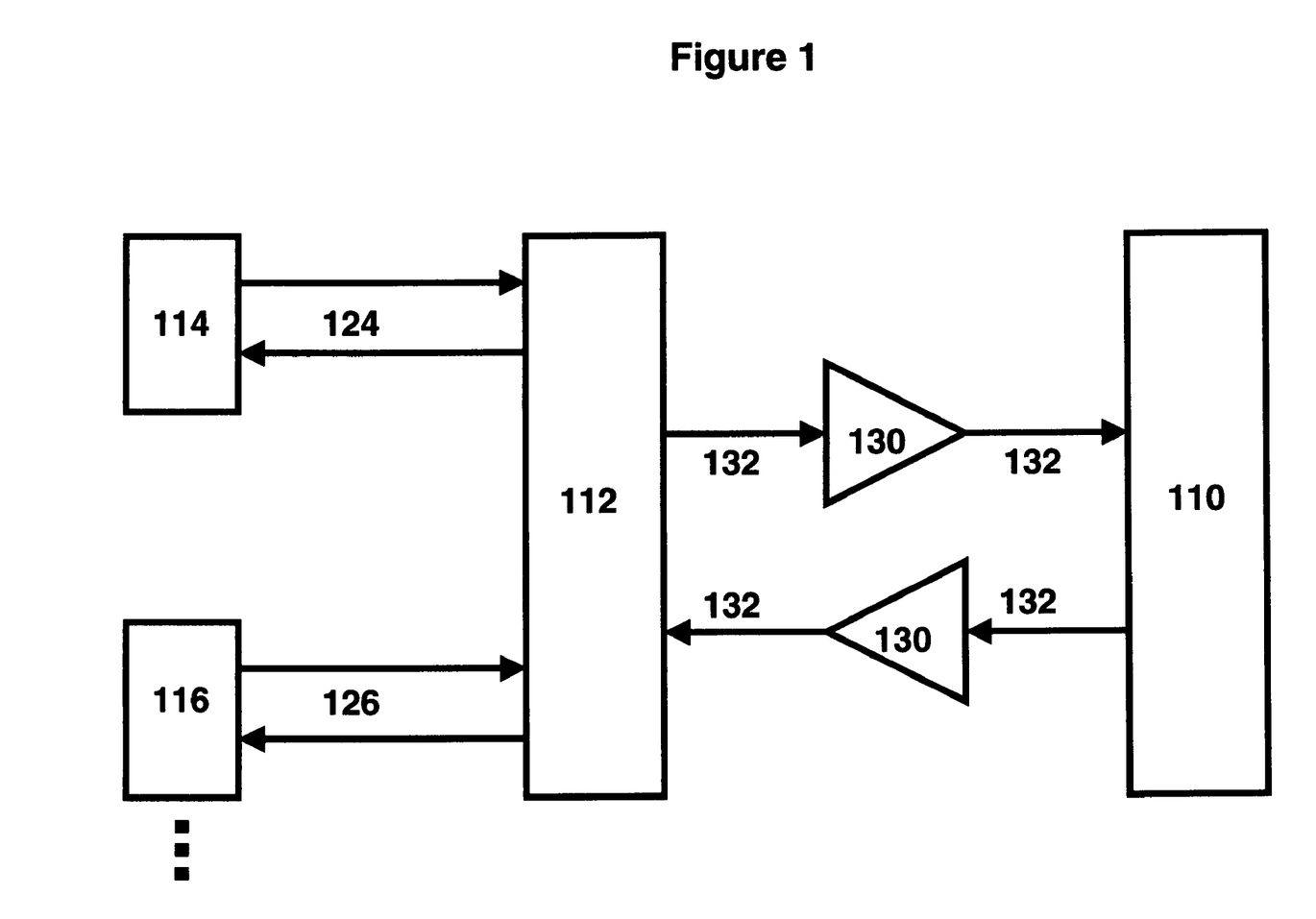
FIG. 1 is a schematic illustration of a scalable multiplexed optical transport system.

In FIG. 1 is shown a block diagram of an optical transport system with a distributed terminal architecture as taught by Jaggi. The distributed terminal architecture of one preferred embodiment comprises master terminal 110, terminal 112 and remote terminals 114 and 116. A specific advantage of the present invention is scalability that allows additional terminals and remote terminals to be added to the architecture. In FIG. 1, master terminal 110 and terminal 112 comprise terminals separated by long haul distances. In a preferred embodiment, a plurality of spans 132 and in-line amplifiers 130 will enable total link distances that are measured in thousands of kilometers. As an example, master terminal 110 may be located in one metropolitan area, while terminal 112 may be located in a second metropolitan area located 6000 km away. Terminal 112 may function as a remote terminal where it is located. In addition to terminal 112, there is also remote terminal 114 and second remote terminal 116 located in the second metropolitan area. In this example, terminal 112, remote terminal 114 and remote terminal 116 comprise distributed terminals in the second metropolitan area. In a preferred embodiment, the fiber link pair 124 between terminal 112 and remote terminal 114 may be a distance of 50 km. In the preferred embodiment, the fiber link pair 126 between terminal 112 and remote terminal 116 may also be 50 km in length. In operation, duplex communication will occur between master terminal 110 and any of terminal 112, remote terminal 114 or remote terminal 116. In a preferred embodiment, one set wavelengths in a spectral band from master terminal 110 terminate in terminal 112, a second set of wavelengths in a spectral band from master terminal 110 terminate in remote terminal 114 and a third set of wavelengths in a spectral band from master terminal 110 terminate in remote terminal 116. In a preferred embodiment, the spectral band is the L-band, which extends from approximately 1565 nm to 1605 nm.

It should be noted that master terminal 110 may also be replaced with a distributed architecture in the first metropolitan area.

FIG. 1 depicts an optical transport system supporting duplex operation wherein each endpoint can both send and receive voice and data traffic. This is important to achieve a typical conversation. In FIG. 1, duplex operation is shown to use two distinct fibers, the both together often referred to as a fiber pair. For example, optical transport systems are sometimes deployed with bidirectional traffic providing duplex service on a single fiber.

Figure 2:
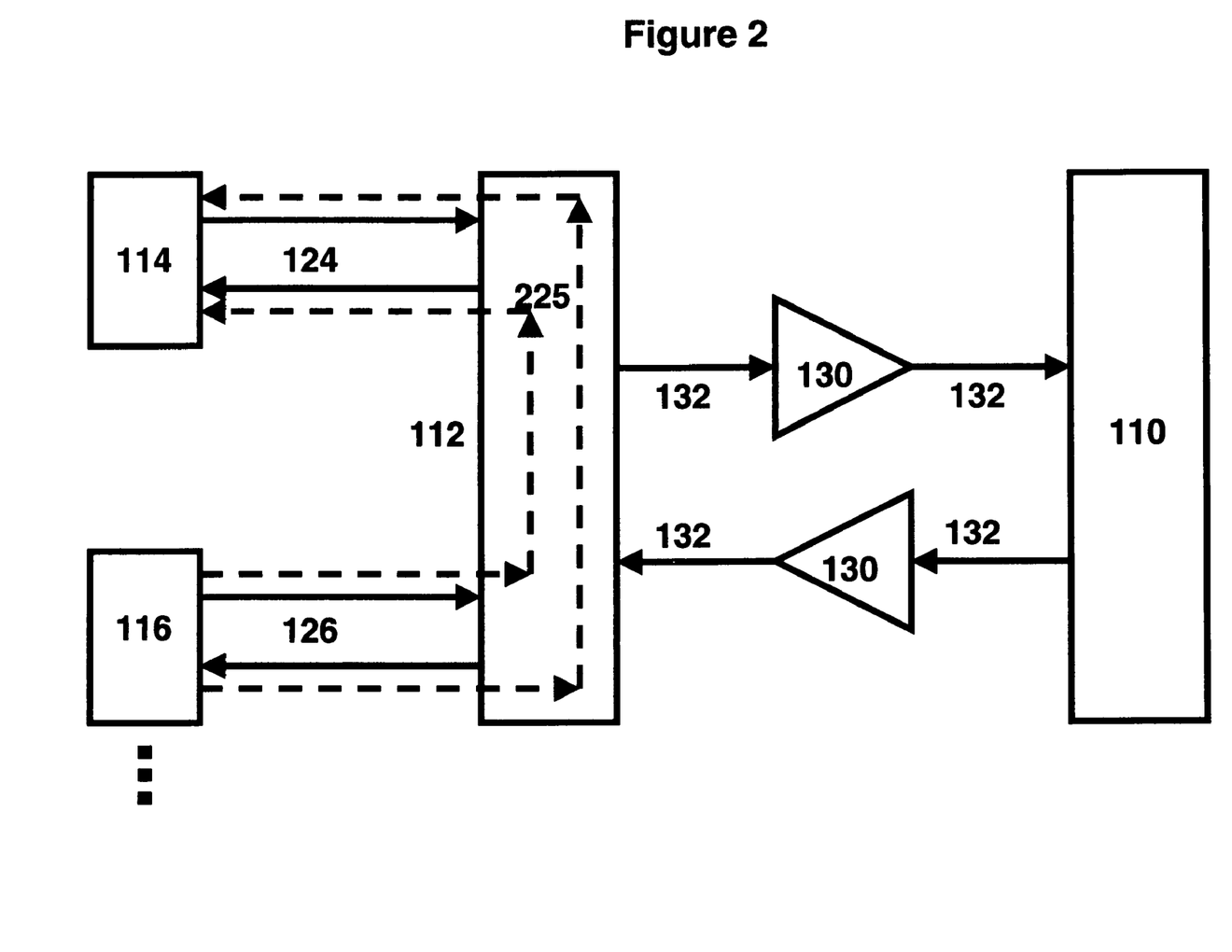
FIG. 2 is a schematic illustration of a scalable multiplexed optical transport system with a distributed terminal architecture having connectivity between remote terminals.

In FIG. 2 is shown a schematic illustration of a multiplexed optical transport system with a distributed terminal architecture having duplex connectivity 225 between terminal 112 and remote terminals 114 and 116. The ellipses below remote terminal 116 indicate that any number of remote terminals can be accommodated. In a preferred embodiment, duplex connectivity 225 is a very high data rate optical link enabled by wavelengths not used in duplex communication with master terminal 110. For example, if duplex communication with master terminal 110 uses optical signals in the L-band, then duplex connectivity between terminal 112 and remote terminal 114 may use signals in the C-band.

Figure 3:
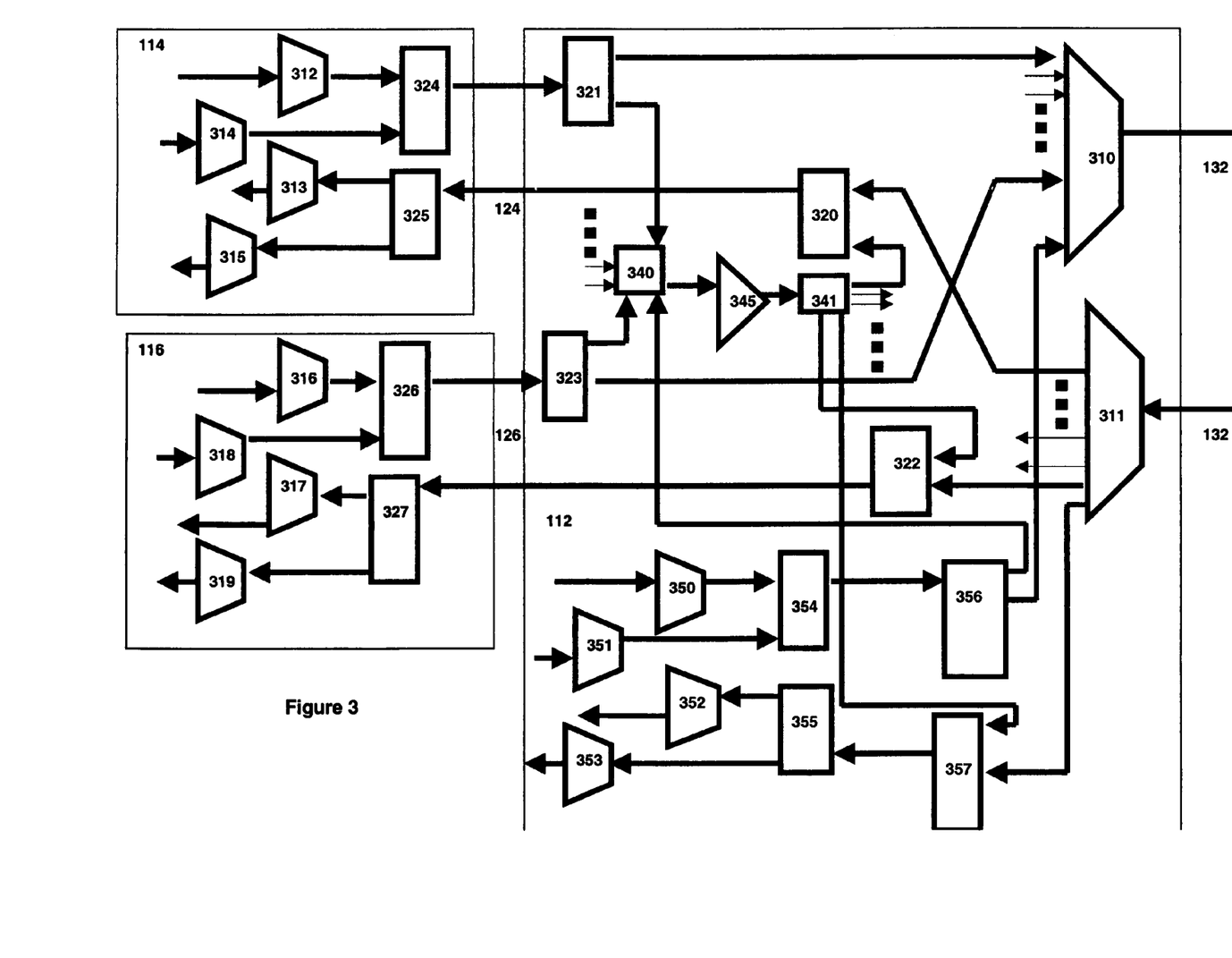
FIG. 3 is a schematic illustration of a scalable optical transport system a distributed terminal architecture having connectivity between remote terminals at a terminal city in accordance with a preferred embodiment.

In FIG. 3 is a block diagram of an optical transport system with a distributed terminal architecture having connectivity between remote terminals at a terminal city in accordance with a preferred embodiment. In particular FIG. 3 shows multiplexing and de-multiplexing arrangements in terminal 112, remote terminal 114 and remote terminal 116 to enable duplex connectivity 225. Shown also is fiber link pair 124 and fiber link pair 126. The arrangement is shown relative to long haul fiber pair 132.

The arrangement comprises multiplexers 310, 312, 314, 316, 318, 350 and 351 as shown in FIG. 3. These multiplexers combine individual wavelengths or channels into bands of wavelengths or channels. Each multiplexer can be a n×1 multiplexer to accommodate differing requirements. In addition, the arrangement comprises de-multiplexers 311, 313, 315, 317, 319, 352 and 353. These de-multiplexers subdivide a band of wavelengths, or channels, into particular wavelengths or channels. Examples of multiplexing and de-multiplexing technologies include thin film filters, array waveguides and interleavers, and combinations thereof.

The arrangement further comprises wavelength selective couplers, 320, 322, 324, 326, 354 and 357 and wavelength selective de-couplers 321, 323, 325, 327, 355 and 356. In a preferred embodiment, wavelength selective couplers may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-couplers may be C/L band de-couplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports.

The arrangement further comprises optical coupler 340, and optical de-coupler 341. In a preferred embodiment, optical coupler 340 and optical de-coupler 341 may be splitters and combiners, in particular a 1×4 splitter and a 1×4 combiner. The ellipsis at 340 and 341 indicate that, in general, optical coupler 340 and optical 341 can be 1×n. A 1×n coupler allows for the invention to be easily scalable by adding additional signals from other remote terminals cheaply and effectively. In another preferred embodiment, AWG technology may be used to implement optical coupler 340 and optical de-coupler 341. In this manner cyclic routing capability is provided. In particular, 4 port AWGs may be used for optical coupler 340 and optical de-coupler 341. Shown in FIG. 3 is a unidirectional optical amplifier 345 to provide gain to the combined short haul signals. The use of a unidirectional optical amplifier further enhances the scalability of the invention by allowing multiple signals to be amplified without additional equipment or connections. Dispersion compensation may be included as part of the unidirectional optical amplifier to add additional capability as additional remote terminals are added.

In another preferred embodiment wavelength selective de-coupler 321 and wavelength selective coupler 320 may be implemented via a splitter or combiner, in particular, a 1×4 splitter/combiner. Similarly, wavelength selective de-coupler 323 and wavelength selective coupler 322 may be implemented via a splitter or combiner, in particular, a 1×4 splitter/combiner. In general a 1×n splitter or combiner may be used. In this embodiment, optical coupler 340 may be implemented as a spectral band coupler and optical de-coupler 341 may be implemented as a spectral band de-coupler.

The flow of signals through this arrangement may now be understood. Long haul traffic enters and departs the metropolitan area via fiber span 132. Entering traffic is de-multiplexed in de-multiplexer 311. The group of channels to be routed to remote terminal 114 proceeds to wavelength selective coupler 320. At remote terminal 114, the group of channels proceeds through wavelength selective de-coupler 325, and are separated into particular channels via de-multiplexer 313. The group of channels to be routed to remote terminal 116 proceeds from de-multiplexer 311 to wavelength selective coupler 322. At remote terminal 116, the group of channels proceeds through wavelength selective de-coupler 327, and are separated into particular channels via de-multiplexer 317. The group of channels to be routed to terminal 112 proceeds from de-multiplexer 311 to selective coupler 357. The group of channels proceeds then through wavelength selective decoupler 355 and are separated into particular channels via demultiplexer 352.

Duplex communication between remote terminal 114 and master terminal 110 is enabled through a signal flow via multiplexer 312, wavelength selective coupler 324, wavelength selective de-coupler 321, and multiplexer 310. Duplex communication between remote terminal 116 and master terminal 110 is enabled through a signal flow via multiplexer 316, wavelength selective coupler 326, wavelength selective de-coupler 323, and multiplexer 310. Duplex communication between terminal 112 and master terminal 110 is enabled through a signal flow via multiplexer 350, wavelength selective coupler 354, wavelength selective decoupler 356 and multiplexer 310.

Duplex connectivity between remote terminals is now described through this arrangement. Signal flow from remote terminal 114 to remote terminal 116 proceeds via terminal 112 through multiplexer 314, wavelength selective coupler 324, wavelength selective de-coupler 321, into optical coupler 340, through unidirectional optical amplifier 345, and into optical de-coupler 341 and on to wavelength selective coupler 322. The desired path for signals continues through terminal 112 to remote terminal 116, proceeds via wavelength selective coupler 322, wavelength selective de-coupler 327, and through de-multiplexer 319. Depending on the implementation of optical de-coupler 341 there may also be a return path of signals from remote terminal 114, back to remote terminal 114. This return path proceeds via wavelength selective coupler 320, and wavelength selective de-coupler 325. If necessary, these signals are blocked in de-multiplexer 315. Signal flow from remote terminal 116 to remote terminal 114 proceeds through multiplexer 318, wavelength selective coupler 326, wavelength selective de-coupler 323, into optical coupler 340, through unidirectional optical amplifier 345, and into optical de-coupler 341 and on to wavelength selective coupler 320. The desired path for signals to remote terminal 114 then proceeds via wavelength selective coupler 320, wavelength selective de-coupler 325, and through de-multiplexer 315. Depending on the implementation of optical de-coupler 341 there may also be a return path of signals from remote terminal 116, back to remote terminal 116. This return path proceeds via wavelength selective coupler 322, and wavelength selective de-coupler 327. If necessary, these signals are blocked in de-multiplexer 319. Duplex connectivity from terminal 112 to remote terminal 114 and from remote terminal 114 to terminal 112, and from terminal 112 to remote terminal 116 and from remote terminal 116 to terminal 112 is provided in a similar matter. Also, similarly, there may be a return path of signals from terminal 112 back to terminal 112. The invention provides scalability easily with the addition of optical coupler 340, unidirectional amplifier 345 and optical decoupler 341 because additional remote terminals may be added without the need for duplicate amplification.

Additionally, connectivity to other remote terminals can be added in a similar manner. The ellipses near couplers 340 and 341, and de-multiplexer 311 and multiplexer 310, show where additional connections to these terminals may be made.

Figure 4:
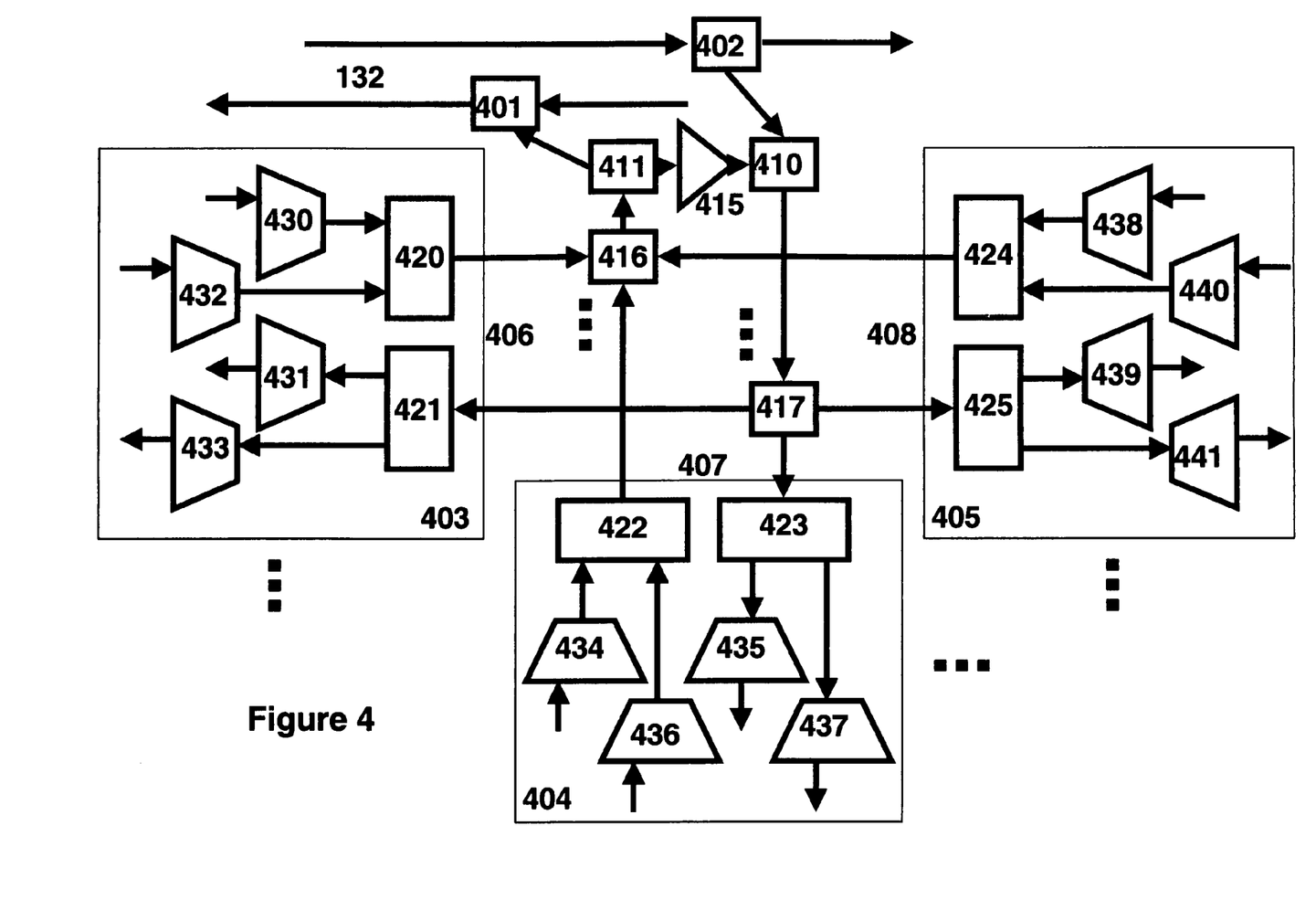
FIG. 4 is a schematic illustration of a scalable optical transport system with a distributed terminal architecture having connectivity among remote terminals at an intermediate optical add-drop multiplexed (OADM) city in accordance with a preferred embodiment.

FIG. 4 is a schematic illustration of an optical transport system with a distributed terminal architecture with connectivity among remote terminals at an intermediate optical add-drop multiplexed (OADM) city in accordance with a preferred embodiment. The arrangement is shown relative to long haul fiber pair 132, and in particular, at an optical add-drop multiplexing (OADM) site which deploys optical coupler 401 and optical de-coupler 402. In a preferred embodiment, optical coupler 401 and optical de-coupler 402 are 50:50 or 3 dB splitters, and the OADM is configured in a broadcast and select mode.

The architecture of the present invention comprises distributed terminals 403, 404 and 405, and enables duplex connectivity among all distributed terminals, or between any two pairs of distributed terminals. Any or all of distributed terminals 403, 404 or 405 may also be remote terminals placed apart from the OADM site, potentially at different locations within a metropolitan area. In a preferred embodiment, short haul fiber pairs 406, 407 and 408 may be approximately 50 km from the OADM site. In will be understood by one skilled in the art, that the distances of short haul fiber pairs 406, 407 and 408 may be unequal, shorter, and, with appropriate optical amplification and dispersion compensation, much longer than 50 km from the OADM site.

The arrangement further comprises wavelength selective coupler 410 and wavelength selective de-coupler 411. In a preferred embodiment, wavelength selective coupler 410 may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-coupler 411 may be C/L band de-couplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports. The arrangement may also comprise optical amplifier 415. As is well known in the art, this optical amplifier may be an erbium doped optical amplifier, or a semiconductor optical amplifier.

The arrangement further comprises optical coupler 416 and optical de-coupler 417. In a preferred embodiment, optical coupler 416 may be a 1×N combiner, and optical de-coupler 417 may be a 1×N splitter. The ellipses indicate that additional remote terminals may be included in other embodiments.

The arrangement further comprises wavelength selective couplers, 420, 422 and 424, and wavelength selective de-couplers 421, 423, and 425. In a preferred embodiment, wavelength selective couplers may be C/L band couplers, which act to couple together C-band signals from one input port and L-band signals from a second input port, and combine them onto a single output port. One technology known in the art for this C/L band coupler is thin film filter technology. In a preferred embodiment, wavelength selective de-couplers may be C/L band decouplers, which act to de-couple C-band signals and L-band signals from a single input port into C-band signals on a first output port and L-band signals on a second output port. One technology known in the art for this C/L band de-coupler is thin film filter technology. It is noted that a C/L band coupler using thin film filter technology may be used as a C/L band de-coupler by reversing the input and output designations on the ports.

The arrangement comprises multiplexers 430, 432, 434, 436, 438 and 440. These multiplexers combine individual wavelengths or channels into bands of wavelengths or channels. In addition, the arrangement comprises de-multiplexers 431, 433, 435, 437, 439 and 441. These de-multiplexers subdivide a band of wavelengths, or channels, into particular wavelengths or channels. Examples of multiplexing and de-multiplexing technologies include thin-film filters, AWGs and inter-leavers, and combinations thereof.

The flow of signals through this arrangement may now be understood. Long haul traffic enters and departs the OADM via fiber span 132. Entering traffic is split using optical de-coupler 402 and propagates through wavelength selective optical coupler 410. Optical de-coupler 417 broadcasts the entering traffic to remote terminals 403, 404 and 405. At remote terminals 403, 404 and 405, the entering traffic proceeds through wavelength selective de-coupler 421, 423 and 425, and is separated into particular channels via de-multiplexers 431, 435 and 439.

Traffic from distributed terminal 403 intended for transmission on fiber span 132 proceeds from multiplexer 430 to wavelength selective optical coupler 420 and optical coupler 416. The signal proceeds to wavelength selective decoupler 411 to optical coupler 401 onto fiber span 132. Traffic from distributed terminal 404 intended for transmission on fiber span 132 proceeds from multiplexer 434 to wavelength selective optical coupler 422 and optical coupler 416. The signal proceeds to wavelength selective decoupler 411 to optical coupler 401 onto fiber span 132. Traffic from distributed terminal 405 intended for transmission on fiber span 132 proceeds from multiplexer 438 to wavelength selective optical coupler 424 and optical coupler 416. The signal proceeds to wavelength selective decoupler 411 to optical coupler 401 onto fiber span 132.

Connectivity among the distributed terminals is now described through this arrangement. Signals destined for remote terminals 404 and 405 that originates from remote terminal 403 proceeds via multiplexer 432, wavelength selective optical coupler 420, optical coupler 416. From wavelength selective optical coupler 420 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410 and optical de-coupler 417. Optical de-coupler 417 routes the traffic to remote terminals 404 and 405. Depending on the implementation, there may also be a return path to remote terminal 403. Such traffic is blocked or otherwise sorted via de-multiplexer 433. In remote terminal 404, the traffic is routed via wavelength selective optical de-coupler 423 and optical de-multiplexer 437. In remote terminal 405, the traffic is routed via wavelength selective optical de-coupler 425 and optical de-multiplexer 441.

Signals destined for remote terminals 403 and 405 that originate from remote terminal 404 proceed via multiplexer 436, wavelength selective optical coupler 422, optical coupler 416. From wavelength selective optical coupler 422 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410. Optical de-coupler 417 routes the traffic to remote terminals 403 and 405. Depending on the implementation, there may also be a return path to remote terminal 404. Such traffic is blocked or otherwise sorted via de-multiplexer 437. In remote terminal 403, the traffic is routed via wavelength selective optical de-coupler 421 and optical de-multiplexer 433. In remote terminal 405, the traffic is routed via wavelength selective optical de-coupler 425 and optical de-multiplexer 441.

Signals destined for distributed terminals 403 and 404 that originate from remote terminal 405 proceed via multiplexer 440, wavelength selective optical coupler 424, optical coupler 416. From wavelength selective optical coupler 424 until wavelength selective optical de-coupler 411, long haul traffic and short haul traffic propagates together. Wavelength selective optical de-coupler 411 decouples the long haul traffic from the short haul traffic. The short haul signal may proceed through optical amplifier 415, and then into wavelength selective optical coupler 410. Optical de-coupler 417 routes the traffic to remote terminals 403 and 404. Depending on the implementation, there may also be a return path to remote terminal 405. Such traffic is blocked or otherwise sorted via de-multiplexer 441. In remote terminal 403, the traffic is routed via wavelength selective optical de-coupler 421 and optical de-multiplexer 433. In remote terminal 404, the traffic is routed via wavelength selective optical de-coupler 423 and optical de-multiplexer 437.

Additional distributed terminals may be connected and traffic between terminals will flow in a similar manner to the above descriptions for terminals 403, 404 and 405. The ellipses in FIG. 4 indicate additional distributed terminals and additional ports of coupler 416 and decoupler 417.

Figure 5:
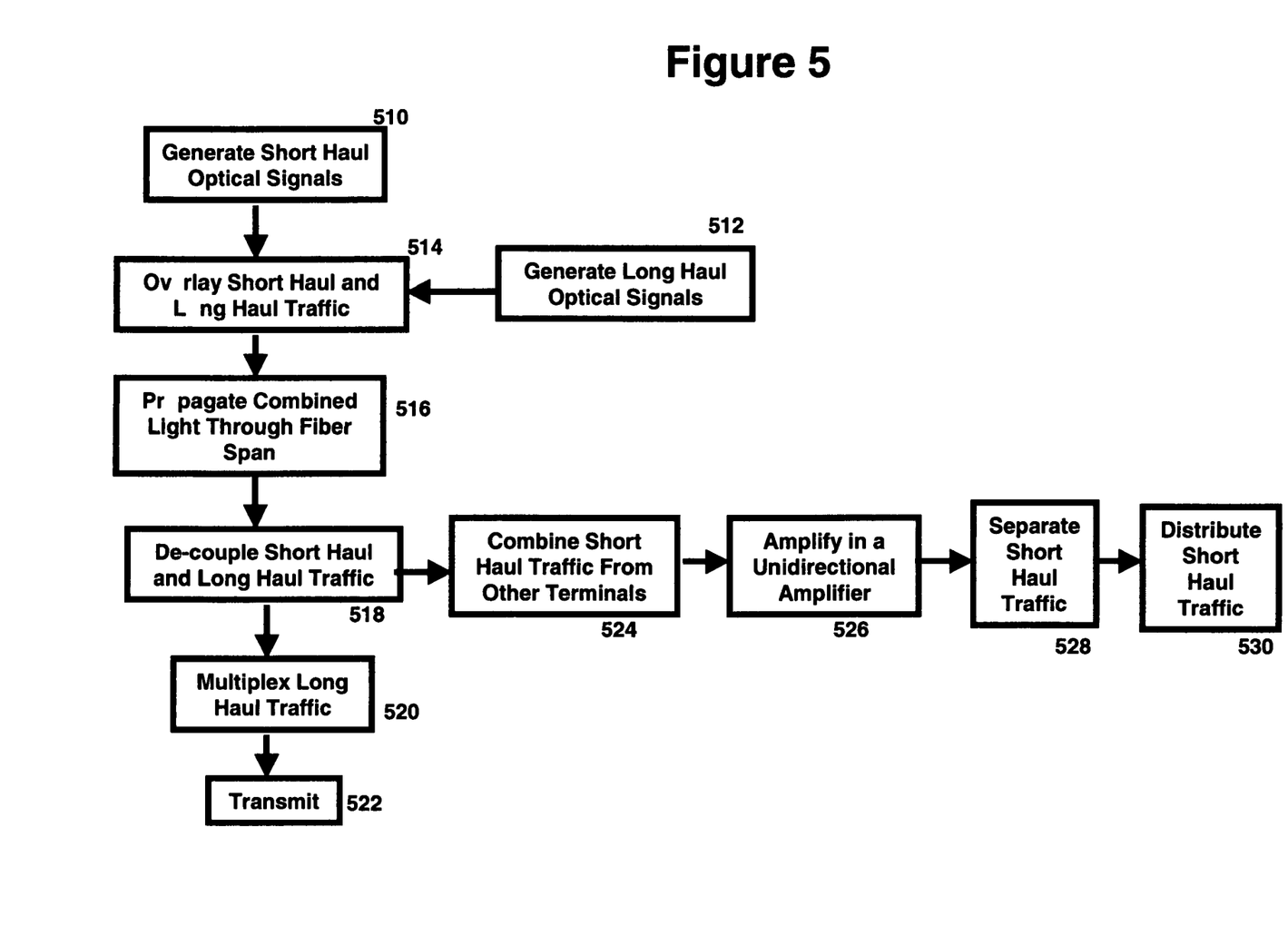
FIG. 5 is a flow chart of the method of combining short haul traffic with long haul traffic in accordance with this invention.

In FIG. 5 is shown a flow chart of the method of combining short haul traffic with long haul traffic in order to provide connectivity between distributed terminals which is a subject of this invention. In step 510, short haul traffic is generated on a first spectral band. In a preferred embodiment, this first spectral band is the C-band. In step 512, long haul traffic is generated on a second spectral band. In a preferred embodiment, this first spectral band is the L-band. In step 514, the first spectral band and second spectral band are over-layed. In a preferred embodiment this step is accomplished using a wavelength selective optical coupler. A wavelength selective optical coupler may be a C/L band coupler. A thin film filter may be used to realize a C/L band coupler. In step 516 the combined traffic is propagated along a metropolitan fiber span. In step 518, the short haul traffic is separated from the long haul traffic. In a preferred embodiment this step is accomplished using a wavelength selective optical de-coupler. A wavelength selective optical de-coupler may be a C/L band de-coupler. A thin film filter may be used to realize a C/L band de-coupler. At step 518, the short haul and long haul traffic is also split into two directions. Long haul traffic is multiplexed at step 520, followed by transmission on long haul optical fiber 522. Short haul traffic is combined with other short haul traffic from other terminals in step 524. It is amplified in unidirectional amplifier at 526 and then is separated into specific short haul traffic at step 528. When separated, the short haul traffic is distributed at step 530. In a preferred embodiment, this method provides half-duplex connectivity between two distributed terminals, and may be repeated in the opposite traffic flow direction to achieve duplex connectivity between the two distributed terminals.

In an alternate embodiment, this method may be used to provide connectivity between a distributed terminal and a central location such as a master terminal or an OADM site. Additional routing from the central location is employed to further propagate the short haul traffic to a second distributed terminal. In a preferred embodiment, this additional routing may be achieved using an optical de-coupler. An optical splitter may be used to realize the optical de-coupler. In a preferred embodiment, this method provides half-duplex connectivity between two distributed terminals, and may be repeated in the opposite traffic flow direction to achieve duplex connectivity between the two distributed terminals.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A distributed terminal for communicating duplex optical traffic, the distributed terminal comprising:
a wavelength selective optical coupler configured to receive first short haul traffic and first long haul traffic, combine the first short haul traffic and the first long haul traffic into a first combined signal, and output the first combined signal, wherein the first short haul traffic of the first combined signal is configured to be transmitted to a remote terminal via a first network, and wherein the first long haul traffic of the first combined signal is configured to be transmitted to a master terminal via a second network; and
a wavelength selective optical decoupler configured to receive a second combined signal, decouple second short haul traffic and second long haul traffic from the second combined signal, and output the second short haul traffic and the second long haul traffic, wherein the second short haul traffic of the second combined signal is received from the remote terminal via the first network, and wherein the second long haul signal of the second combined signal is received from the master terminal via the second network.

2. The distributed terminal of claim 1 wherein the wavelength selective optical coupler comprises a C/L band coupler.

3. The distributed terminal of claim 2 wherein the C/L band coupler comprises a thin film decoupler.

4. The distributed terminal of claim 1 wherein the first and second long haul traffic is transmitted on a L-band.

5. The distributed terminal of claim 1 wherein the first and second short haul traffic is transmitted on a C-band.

6. The distributed terminal of claim 1 further comprising an amplifier connected to the wavelength selective optical coupler, wherein the amplifier is configured to amplify the second short haul traffic.

7. The distributed terminal of claim 1 wherein the wavelength selective optical coupler comprises a spectral band coupler.

8. The distributed terminal of claim 1 wherein the wavelength selective optical decoupler comprises a spectral band decoupler.

9. The distributed terminal of claim 1 wherein the wavelength selective optical decoupler comprises a C/L band decoupler.

10. The distributed terminal of claim 9 wherein the C/L band decoupler comprises a thin film decoupler.

11. The distributed terminal of claim 1 wherein the distributed terminal and the remote terminal are each located in a first metropolitan area, and
wherein the master terminal is located in a second metropolitan area that is different than the first metropolitan area.

12. The distributed terminal of claim 1 wherein the distributed terminal and the remote terminal are located in the same metropolitan area.

13. A method of communicating duplex optical traffic between distributed terminals, the method comprising:
receiving first long haul traffic on a first spectral band;
receiving first short haul traffic on a second spectral band;
coupling the first short haul traffic and the first long haul traffic at a first distributed terminal to produce a first combined signal;
outputting the first combined signal, wherein the first short haul traffic of the first combined signal is configured to be transmitted to a second distributed terminal via a first network, and wherein the first long haul traffic of the first combined signal is configured to be transmitted to a third distributed terminal via a second network;
receiving a second combined signal at the first distributed terminal; and
decoupling second short haul traffic and second long haul traffic from the second combined signal at the first distributed terminal, wherein the second short haul traffic of the second combined signal is received from the second distributed terminal via the first network, and wherein the second long haul signal of the second combined signal is received from the third distributed terminal via the second network.

14. The method of claim 13 further comprising amplifying the second short haul traffic.

15. The method of claim 13 wherein the first spectral band comprises a L-band.

16. The method of claim 13 wherein the second spectral band comprises a C-band.

17. The method of claim 13 wherein the first short haul traffic and the first long haul traffic is coupled via a C/L band coupler.

18. The method of claim 17 wherein the C/L band coupler comprises a thin film coupler.

19. The method of claim 13 wherein the second short haul traffic and the second long haul traffic are decoupled via a C/L band decoupler.

20. The method of claim 19 wherein the C/L band decoupler comprises a thin film coupler.

21. An architecture for transporting a first long haul optical signal, a second long haul optical signal and a first short haul optical signal, the architecture comprising:
 a first remote terminal for receiving the first long haul optical signal and the first short haul optical signal into a first optical coupler and for transmitting a first combined optical signal on a first optical pathway;
 a first distributed terminal connected to the first optical pathway for receiving the first combined optical signal into a first optical decoupler and for transmitting the first short haul optical signal to a second optical coupler and the first long haul optical signal on a second optical pathway;
 the second optical coupler connected to a second optical decoupler for receiving the first short haul optical signal;
 the first distributed terminal for receiving the second long haul optical signal and for combining it with the first short haul optical signal from the second optical decoupler in a third optical coupler and for transmitting a second combined optical signal on a third optical pathway; and
 a second remote terminal connected to the third optical pathway for receiving the second combined optical signal into a third optical decoupler and for transmitting the first short haul optical signal on a fourth optical pathway and the second long haul optical signal on a fifth optical pathway.

22. The architecture of claim 21 wherein a second distributed terminal is connected to the second optical pathway.

23. The architecture of claim 22 wherein the second distributed terminal transmits the second long haul signal.

24. The architecture of claim 22 wherein the second optical pathway includes an amplifier.

25. The architecture of claim 21 wherein the first and second long haul optical signals are L band.

26. The architecture of claim 21 wherein the first short haul optical signal is C band.

27. The architecture of claim 21 wherein the first, second and third optical couplers comprise C/L band couplers.

28. The architecture of claim 21 wherein the first, second and third optical decouplers comprise C/L band decouplers.

29. The architecture of claim 21 wherein the first short haul optical signal is comprised of a plurality of sub-short haul signals.

30. The architecture of claim 29 wherein the plurality of sub-short haul signals are combined in a multiplexer.

31. The architecture of claim 30 wherein the multiplexer includes a thin film filter.

32. The architecture of claim 21 wherein the first long haul optical signal is comprised of a plurality of sub-long haul signals.

33. The architecture of claim 32 wherein the plurality of sub-long haul signals are combined in a multiplexer.

34. The architecture of claim 33 wherein the multiplexer includes a thin film filter.

35. The architecture of claim 21 further comprising:
 the second remote terminal for receiving a third long haul optical signal and a second short haul signal into a fourth optical coupler and for transmitting a third combined optical signal on a sixth optical pathway;
 the first distributed terminal connected to the sixth optical pathway for receiving the third combined optical signal into a fourth optical de-coupler and for transmitting the second short haul optical signal to the second optical coupler and the third long haul signal on a seventh optical pathway;
 the second optical decoupler for receiving the second short haul optical signal;
 the first distributed terminal for receiving a fourth long haul optical signal and for combining it with the second short haul optical signal from the second optical decoupler into a fifth optical coupler and for transmitting a fourth combined optical signal on an eighth optical pathway; and
 the first remote terminal connected to the eighth optical pathway for receiving the fourth combined optical signal into a fifth optical de-coupler and for transmitting the second short haul optical signal on a ninth optical pathway and the fourth long haul optical signal on a tenth optical pathway.

36. The architecture of claim 35 wherein the second distributed terminal is connected to the seventh optical pathway.

37. The architecture of claim 36 wherein the seventh optical pathway includes an amplifier.

38. The architecture of claim 36 wherein the second distributed terminal transmits the fourth long haul optical signal.

39. The architecture of claim 35 wherein the first distributed terminal further comprises a multiplexer to combine the first long haul optical signal and the third long haul optical signal.

40. The architecture of claim 39 wherein the multiplexer includes a thin film filter.

41. The architecture of claim 35 wherein the second short haul optical signal is comprised of a plurality of sub-short haul signals.

42. The architecture of claim 41 wherein the plurality of sub-short haul signals are combined in a multiplexer.

43. The architecture of claim 42 wherein the multiplexer includes a thin film filter.

44. The architecture of claim 35 wherein the third long haul optical signal is comprised of a plurality of sub-long haul signals.

45. The architecture of claim 44 wherein the plurality of sub-long haul signals are combined in a multiplexer.

46. The architecture of claim 45 wherein the multiplexer includes a thin film filter.

47. The architecture of claim 35 wherein the second long haul optical signal and the fourth long haul optical signal arrive at the first distributed terminal as a combined long haul signal and are separated by a multiplexer.

48. The architecture of claim 47 wherein the multiplexer includes a thin film filter.

49. The architecture of claim 35 wherein the second optical pathway and the seventh optical pathway are combined by a multiplexer.

50. The architecture of claim 49 wherein the multiplexer includes a thin film filter.

51. The architecture of claim 35 wherein the first distributed terminal is configured to transmit the first short haul optical signal and the second short haul optical signal through at least one amplifier.

52. An architecture for distributing short haul signals and long haul signals, the architecture comprising:
- a first distributed terminal, a second distributed terminal, and a third distributed terminal, each in communication with one another,
- wherein the first distributed terminal includes an optical combiner for receiving a short haul signal and a first long haul signal,
- wherein the optical combiner is configured to combine the short haul signal and the first long haul signal into a first meta signal and to route the first meta signal to the second distributed terminal,
- wherein the second distributed terminal includes a selective coupler and a selective decoupler,
- wherein the selective decoupler is configured to decouple the short haul signal and the first long haul signal from the first meta signal and to route the first long haul signal to a transport system and the short haul signal to the selective coupler,
- wherein the selective coupler is configured to receive a second long haul signal from the transport system, combine the second long haul signal with the short haul signal to generate a second meta signal, and transmit the second meta signal to the third distributed terminal, and
- wherein the third distributed terminal includes an optical decoupler for separating the second meta signal into the short haul signal and the second long haul signal.

53. The architecture of claim 52 wherein the short haul signal of the second meta signal includes a plurality of multiplexed short haul signals and the second long haul signal of the second meta signal includes a plurality of multiplexed long haul signals.

54. The architecture of claim 52 wherein the short haul signal and the first long haul signal received at the first distributed terminal are each created by at least one remote terminal.

55. The architecture of claim 52 wherein the short haul signal is C band.

56. The architecture of claim 52 wherein the first and second long haul signals are L band.

57. The architecture of claim 52 wherein the selective decoupler comprises a wavelength selective filter.

58. The architecture of claim 57 wherein the wavelength selective filter comprises a C/L band decoupler.

59. The architecture of claim 52 wherein the selective coupler comprises a wavelength selective filter.

60. The architecture of claim 59 wherein the wavelength selective filter comprises a C/L band coupler.

61. The architecture of claim 52 wherein the optical combiner comprises a wavelength selective coupler.

62. The architecture of claim 52 wherein the first and second long haul signals are each comprised of a plurality of sub-long haul signals.

63. The architecture of claim 62 wherein the plurality of sub-long haul signals are combined via a multiplexer.

64. The architecture of claim 62 wherein the plurality of sub-long haul signals are split via a demultiplexer.

65. The architecture of claim 52 wherein the short haul signal is comprised of a plurality of sub-short haul signals.

66. The architecture of claim 65 wherein the plurality of sub-short haul signals are combined via a multiplexer.

67. The architecture of claim 65 wherein the plurality of sub-short haul signals are split via a demultiplexer.

68. The architecture of claim 52 wherein the first, second and third distributed terminals are located in the same metropolitan area.

69. The architecture of claim 52 wherein the selective decoupler and the optical decoupler each comprise a respective wavelength selective decoupler.

* * * * *

UNITED STATES PATENT AND TRADEMARK OFFICE
CERTIFICATE OF CORRECTION

PATENT NO. : 7,593,637 B2
APPLICATION NO. : 10/427896
DATED : September 22, 2009
INVENTOR(S) : Chiu et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1247 days.

Signed and Sealed this

Twenty-first Day of September, 2010

David J. Kappos
*Director of the United States Patent and Trademark Office*